(12) United States Patent
Multerer

(10) Patent No.: US 12,242,825 B2
(45) Date of Patent: Mar. 4, 2025

(54) USER INTERFACE GENERATION SYSTEM

(71) Applicant: Kry10 Limited, Wellington (NZ)

(72) Inventor: Boyd Cannon Multerer, Wellington (NZ)

(73) Assignee: Kry10 Limited, Wellington (NZ)

( * ) Notice: Subject to any disclaimer, the term of this patent is extended or adjusted under 35 U.S.C. 154(b) by 0 days.

(21) Appl. No.: 18/442,508

(22) Filed: Feb. 15, 2024

(65) Prior Publication Data

US 2024/0419413 A1    Dec. 19, 2024

Related U.S. Application Data

(63) Continuation of application No. 17/385,635, filed on Jul. 26, 2021, now Pat. No. 11,907,689, which is a continuation of application No. 16/563,813, filed on Sep. 6, 2019, now Pat. No. 11,074,053.

(60) Provisional application No. 62/728,313, filed on Sep. 7, 2018.

(51) Int. Cl.
    *G06F 8/38*       (2018.01)
    *G06F 3/0482*     (2013.01)
    *G06F 8/34*       (2018.01)

(52) U.S. Cl.
    CPC .............. *G06F 8/38* (2013.01); *G06F 3/0482* (2013.01); *G06F 8/34* (2013.01)

(58) Field of Classification Search
    CPC ....................................................... G06F 8/38
    See application file for complete search history.

(56) References Cited

U.S. PATENT DOCUMENTS

| | | | | |
|---|---|---|---|---|
| 2011/0231499 A1* | 9/2011 | Stovicek | ................. | H04L 51/42 709/206 |
| 2015/0334068 A1* | 11/2015 | Liu | ........................ | G06F 16/287 707/738 |
| 2018/0341627 A1* | 11/2018 | Moldovean | .......... | G06F 16/9027 |
| 2019/0095225 A1* | 3/2019 | Nandagopal | .......... | G06F 40/137 |

\* cited by examiner

*Primary Examiner* — Di Xiao
(74) *Attorney, Agent, or Firm* — Shook, Hardy & Bacon L.L.P.

(57) ABSTRACT

Various methods and systems for providing a user interface (UI) generation system for processing UI generation data based on a multi-layer architecture and hierarchically inter-related and supervised scene processes are provided. The UI generation system supports generating UIs based on a scene layer, a viewport layer, and a driver layer that each use protocols and data structures to support UI generation, UI fault recovery operations, and distributed UI generation for UI viewing devices. In operation, scene configuration data is communicated to a viewport engine from a scene engine, the viewport engine uses the scene configuration data to construct a scene management data structure that is defined based on hierarchically arranging and supervising different scene processes. The scene management data structure is used to define scene rendering data that is accessed by a driver engine to cause generation of UI display content, locally or remotely based on the scene rendering data.

20 Claims, 7 Drawing Sheets

USER INTERFACE GENERATION SYSTEM

CROSS-REFERENCE

This application is a continuation of U.S. application Ser. No. 17/385,635, filed on Jul. 26, 2021, which itself is a continuation of U.S. application Ser. No. 16/563,813, filed Sep. 6, 2019, now U.S. Pat. No. 11,074,053, which itself claims priority of U.S. Provisional Application No. 62/728,313, filed Sep. 7, 2018, the contents of each are hereby incorporated by reference in their entirety.

BACKGROUND

Users rely on user interfaces on computing systems to operate and use different types of applications, such as desktop applications, internet browsers, handheld computers and computer kiosks. User interfaces may be accessible directly on a device or through a remote client display with access to a device associated with the device's corresponding user interface. For example, Internet of Things (IoT) devices may be manufactured as different types of physical devices that are accessible through user interfaces, and embedded electronics in devices may include displays for accessing these devices. IoT devices may specifically be accessed remotely to perform configurations or retrieve data associated with the IoT devices. With the ever-increasing use of computing devices and especially IoT devices or other embedded electronics for performing computing tasks, improvements in computing functions for generating user interfaces can provide more efficient presentation of user interfaces and efficiency in user navigation of graphical user interfaces for computing devices.

SUMMARY

Embodiments of the present invention relate to methods, systems, and computer storage media for providing a user interface (UI) generation system for processing of UI generation data or instructions based on a multi-layer architecture. The multi-layer architecture processes and manages hierarchically interrelated and supervised scene processes (i.e., instances of user interface functionality). In particular, the UI generation system provides for generating UIs based on a scene layer, a viewport layer, and a driver layer. The scene layer, the viewport layer, and the driver layer support processing and managing the hierarchical interrelated and supervised scene processes, using rules or protocols and data structures to support UI generation, UI fault recovery operations, and distributed UI generation for remote viewing devices.

By way of background, user interfaces generally support how users interact with different types of computing devices. There are several types of user interfaces that support different types of interactions with computing devices. For example, a user interface may include display interfaces and input interfaces, such that a user can view information and also enter or communicate information to a computing device. Conventional user interface (UI) generation systems may be limited in supporting user interface interactions for devices. In particular, limitations in current user interface systems may include the size burden of user interface generation systems (e.g., embedded browser applications over several megabytes or gigabytes), lack of robustness (e.g., user interfaces that fail and crash the application or device), and security exposure (e.g., multiple open ports) that make the corresponding devices with the user interfaces vulnerable to attacks.

By way of example, Internet of Things (IoT) style devices optimally should be configured with a lightweight UI generation system with remote accessibility; however several of these IoT devices are encumbered with sizable browsers or other types of user interface generation software. The UIs, as designed, may include features that allow intruders (e.g., hackers) to exploit the UI features and gain unauthorized access to information or hide UI elements from display on the UI. The limitations in conventional UI generation software may impact different types of embedded graphical user interfaces. And, while some attempts to address several different aspects of the above-identified issues have been made, no current implementations comprehensively provide a solution for resolving these issues. As such, an alternative approach for providing and generating user interfaces would improve computing functionality in user interface technology.

Embodiments of the present disclosure are directed towards improving user interface generation systems based on providing a UI generation system for processing of UI generation data instructions based on a multi-layered architecture. The multi-layered architecture processes and manages hierarchically interrelated and supervised scene processes. In particular, the UI generation system includes a multi-layer user interface engine (i.e., scene layer, viewport layer, and driver layer) that performs operations based on hierarchy-based elements (e.g., UI language, scene protocols and rules, and scene data structures) that support the hierarchical interrelated supervised scene processes.

The scene layer, viewport layer, and driver layer of the multi-layer user interface engine may be configured to interoperate based on UI management and generation protocols, such that scene UI operations are executed and UI generation data are communicated between the layers for generating user interfaces. For example, a developer using a UI language may define scene generation data that hierarchically identifies supervised scene processes corresponding to UI display content (e.g., navigation bar, slider, and buttons) of a user interface. The scene generation data may further identify for the supervised scene processes, their interrelationships and a logic for processing input events associated with the scene processes. Moreover, the scene generation data, based on the UI language, is processed using a scene management data structure (e.g., a supervision tree) to hierarchically arrange scene processes (i.e., UI display content) for rendering using a driver. The UI management and generation protocols for communicating between the layers and providing the UI generation functionality are both based on the same functional process-based language (e.g., a declarative programming language). In particular, the functional processed-based language supports defining, managing, and generating UI display content based on scene processes and different types of scene data.

Additionally, the UI generation system provides operations for identifying UI faults (e.g., scene process faults) and distributed generation of UI display content. With identifying UI faults, the UI generation system provides operations for seamlessly recovering from UI faults, while managing and processing the hierarchically related scene processes that are associated with a faulty scene process. With distributed generation of the UI, the UI generation system provides operations for distributed generation of a UI, in that a UI can be made available remotely to a viewing device (e.g., administrator), even though the UI processing logic and operations are actually performed on a UI device with an embedded instance of the UI generation system. Advantageously, the UI generation system is a light-weight UI generation system. The light-weight UI generation system includes hierarchy-based elements (e.g., UI language, scene protocols and rules, and scene data structures). The hierarchy-based elements support the hierarchical interrelated supervised scene processes that reduce the size burden of user interface generation systems, provide failure and crash recovery for applications or devices, reduce vulnerability to attacks.

In operation, in an example embodiment, a scene engine accesses scene generation data, where scene generation data is associated with a graph portion and a logic portion comprising instructions for generating UI display content. In this way, a developer can define scene generation data for generating UI display content for different types of devices with the instructions defined in the graph portion and logic portion. Based on the scene generation data, scene configuration data is generated, where the scene configuration data includes several scene processes that are hierarchically interrelated and supervised. The scene processes, which can be instances of user interfaces functionality, are associated with UI display content. The scene configuration data is communicated to a viewport engine that uses the scene configuration data to construct a scene management data structure, where the scene management data structure is defined based on hierarchically arranging and supervising different scene processes. The scene management data structure is used to define scene rendering data that is accessed by a driver engine to cause generation of UI display content (e.g., locally or remotely) based on the scene rendering data.

As such, the embodiments described herein provide an improved user interface generation system for providing a UI generation system for processing of UI generation data or UI instructions based on a multi-layered architecture that processes and manages hierarchical interrelated and supervised scene processes for providing different UI functionality. Advantageously, the operations, data structures, and the ordered combination of steps improve UI functionality for the generation UIs by providing more efficient processing, storage, retrieval, and management of UI generation data and improved computing functionality for user navigation of user interfaces.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
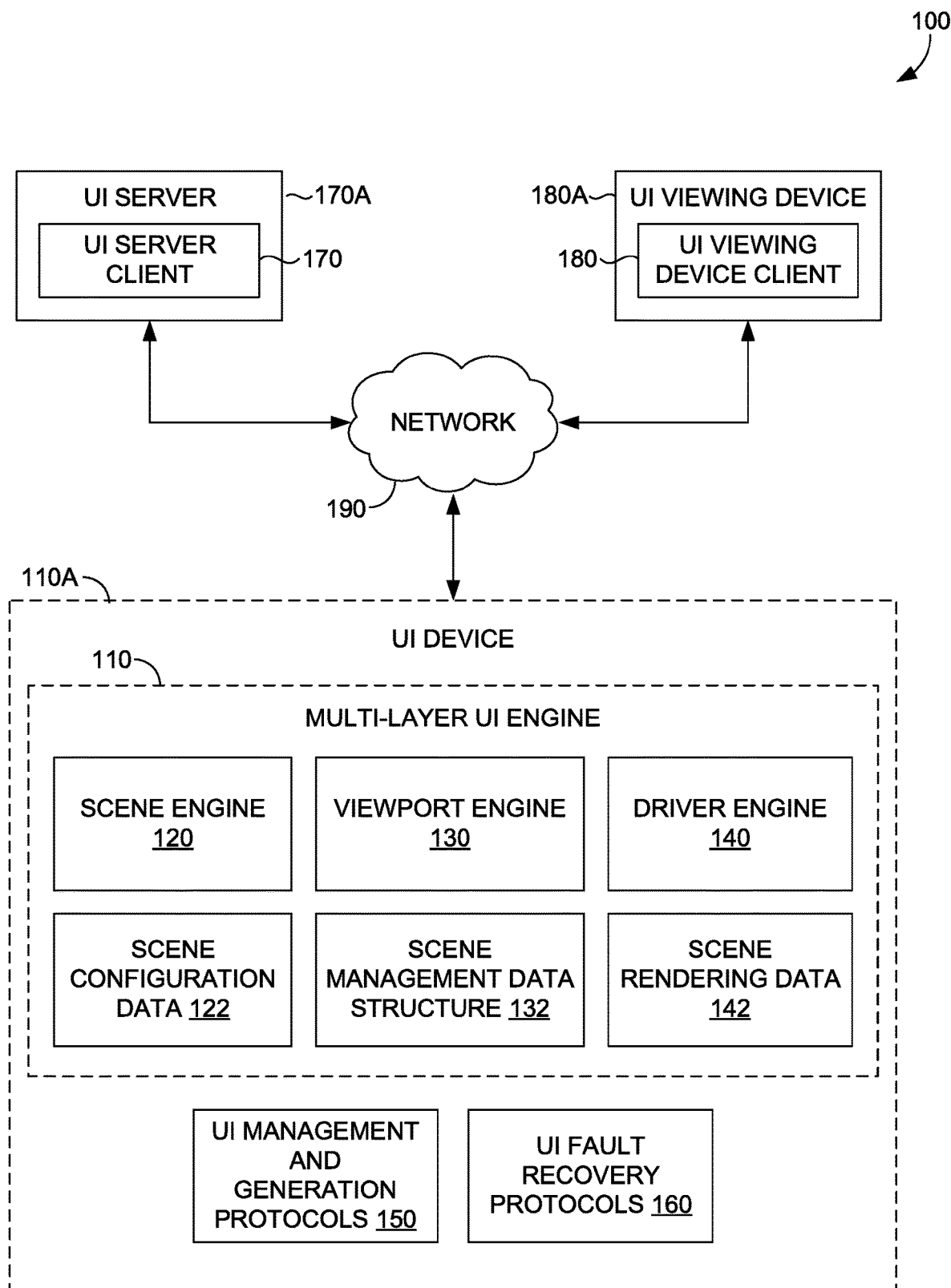
FIG. 1 is a block diagram of an exemplary user interface generation system, in which embodiments described herein may be employed.

User interfaces support human interaction with different types of applications including desktop applications, internet browsers, handheld computers and computer kiosks. User interfaces generally support how users interact with different types of computing devices. There are several types of user interfaces that support different types of interactions with computing devices. For example, user interfaces may include display and input interfaces such that a user can view information and also enter or communicate information to a computing device. User interfaces may be accessible directly on a device or through a remote client display with access to a device associated with the corresponding user interface. For example, Internet of Things (IoT) devices may be manufactured as different types of physical devices accessible through user interfaces, and different types of embedded electronics in devices may include displays for accessing these devices. IoT devices may specifically be accessed remotely to perform configurations or retrieve data associated with the IoT device. User interfaces may be supported via systems that support user interface operations to generate display information or receive user input. For example, a web browser installed on a router can support accessing and configuring the router to perform router operations.

Conventional user interface generation systems may be limited in supporting user interface interactions for devices. Limitations in current user interface systems may include the size burden of the user interface generation system (e.g., browser application over several megabytes or gigabytes), lack of robustness (e.g., user interfaces that fail and crash), and security exposure (e.g., multiple open ports) that make the user interfaces and corresponding device vulnerable to attacks. For example, Internet of Things (IoT) style devices optimally should be configured with a lightweight UI generation system and with remote accessibility; however several of these IoT devices are encumbered with sizable browsers or other types of user interface generation software. Crashes in user interfaces on different types of devices may cause the corresponding applications to restart or require rebooting the entire UI device associated with the user interface, among other types of less than ideal recovery operations. User interfaces that are supported via a server operating system can expose the UI device to server hacks, in that the server operating system lacks security parameters for both providing sanctioned access to the UI device while restricting unsanctioned access to the UI device.

Different types of embedded graphical user interfaces may attempt to address some and different aspects of the above-identified issues but do not comprehensively provide a solution for resolving these issues. For example, some systems may support providing embedded graphical user interfaces but without providing a lightweight user interface generation system. These systems do not provide a secure infrastructure for restricting access, and they may also lack both the capacity to quickly and seamlessly recover from crashes, faults, or UI errors. Conventional systems may also render the actual device obsolete, in that the configuration of the device may only be possible through an external server, which if the server becomes unavailable, the capacity to configure and use the device is lost. As such, an alternative approach for providing and generating user interfaces would improve computing functionality in user interface technology.

Embodiments of the present invention are directed to simple and efficient methods, systems and computer storage media for improving user interface generation systems based on providing a user interface (UI) generation system for processing of UI generation data or instructions based on a multi-layered architecture that processes and manages hierarchical interrelated and supervised scene processes. In particular, the UI generation system includes a multi-layer interface engine (i.e., scene layer, viewport layer, and driver layer) that performs operations based on hierarchy-based elements (e.g., UI language, scene protocols and rules, and scene data structures). The scene layer, viewport layer, and driver layer may be configured to interoperate based on a UI management and generation protocol, such that scene UI operations are executed and UI generation data are communicated between layers for generating user interfaces. The UI management and generation protocols that support both communicating between the layers and providing the UI generation functionality are both based on the same functional process-based language. In particular, the functional processed-based language supports defining, managing, and generating UI display content based on scene processes and scene data.

Additionally, the UI generation system provides operations for identifying UI faults (e.g., scene process faults) and distributed generation of UI display content. With identifying UI faults, the UI generation system provides operations for seamlessly recovering from UI faults, while managing and processing the hierarchically related scene processes that are associated with a faulty scene process. With distributed generation of the UI, the UI generation system provides operations for distributed generation of a UI, in that a UI can be made available remotely to a viewing device (e.g., administrator), even though the UI processing logic and operations are actually performed on a UI device with an embedded instance of the UI generation system. Advantageously, the UI generation system is a light-weight UI generation system. The light-weight UI generation system includes hierarchy-based elements (e.g., UI language, scene protocols and rules, and scene data structures). The hierarchy-based elements support the hierarchical interrelated supervised scene processes that reduce the size burden of user interface generation systems, provide failure and crash recovery for applications or devices, reduce vulnerability to attacks.

Embodiments of the present invention are described, by way of examples, with reference to several inventive features associated with a user interface generation system. In particular, a multi-layer UI engine, UI server client, and UI viewing device client may support the UI generation functionality described herein. At a high level, a functional process-based language ("UI language") may be used to define UI management and UI generation protocols for generating user interfaces. The UI language, in particular, may be used to process UI generation data based on a multi-layered architecture (i.e., multi-layer engine) that processes and manages hierarchical interrelated and supervised scene processes. The UI management and generation protocols that support both communicating between the layers and providing the UI generation functionality are both based on the same UI language. In particular, the UI language supports defining, managing, and generating UI display content based on supervised scene processes and data (e.g., scene generation data, scene configuration data, and scene rendering data). For example, the underlying generic rules, messages, and standard formats may be leveraged and implemented in the UI generation system. The UI language may be ERLANG developed by ERICSSON; however other variations and combinations of functional processed-based languages are contemplated for providing the functionality described herein. In general, the UI language is employed to provide scene processes that correspond to UI display content, and in particular, the UI generation system utilizes UI management and generation protocols to provide scene process supervision.

With reference to FIG. 1, FIG. 1 illustrates an example user interface generation system (environment) 100 in which implementations of the present disclosure (UI generation system) may be employed. In particular, FIG. 1 shows a high level architecture of user interface generation system 100 having components in accordance with implementations of the present disclosure. Among other components or engines not shown, user interface generation system 100 includes a UI device 110A having a multi-layer UI engine 110. The multi-layer UI engine 110 includes scene engine 120 (scene layer), scene configuration data 122, viewport engine 130 (viewport layer), scene management data structure 132, driver engine 140 (driver layer) and scene rendering data 142. The UI device 110A further include UI management and generation protocols 150 and UI fault recovery protocols 160. The computing device 180 communicates via a network 170 and with a search engine 110. The user interface generation system 100 further includes UI server 170A having UI server client 170 and UI viewing device 180A and UI viewing device client 180.

The scene engine 120 is responsible for processing scene generation data and generating scene configuration data 122. The UI display content is generated using scene generation data. Scene generation data may refer to data or a document that is readable using the UI generation system to generate scene configuration data 122. The scene generation data may be written such that UI display content associated with the scene generation data is processed and displayed on a display. The scene generation data may be defined to operate with the UI language. It is contemplated the scene generation data may be defined based on a combination of one or more the following: markup language, scripting language, document object model (DOM) to represent both the graph and the logic for representing UI display content.

Scene generation data includes two main elements a graph portion and a logic portion. The graph portion may refer to a collection of scene processes that are arranged in hierarchical fashion. The graph portion may be associated with a plurality of UI display content (e.g., navigation bar, button, slider) corresponding to the scene processes, which can be rendered for display. The graph portion may specifically describe a hierarchical arrangement of supervised scene processes that are associated with UI display content. For example, a data from a sensor device may be associated with a scene process as UI display content to display sensor data. The sensor data can include a first sensor data value and a second sensor data value. The first value and the second value can be defined as scene processes that are arranged in a hierarchical order and supervised to support providing UI display content of the first value and then the second value.

The logic portion may refer to additional instructions for processing the scene processes. The logic portion may include additional instructions on how to manage the sensor data. For example, the logic portion may include instructions that the first sensor data is to be displayed in red when below a predefined threshold. The logic portion may provide instructions on how (e.g., functions) to process different types of input events received by the UI generation system. Other types of logic instructions are contemplated with embodiments of the present invention. In this regard, the scene generation data includes both the graph portion having graph portion elements and logic portion and logic portion elements, where the elements further define features of the graph portion and the logic portion respectively.

The scene generation data may be defined by a developer. For example, a developer may use a markup language to define both a graph portion and logic portion for a scene. The developer also uses the scene generation data to further configure the UI display content. For example, the developer may define an auto-layout such that the UI content fits a window size or define automatic resizing of windows having the UI display content. Also, it is contemplated that the UI generation system may be implemented on fixed screen or non-fixed device. Advantageously, the UI generation system may be implemented in fixed screen device as an embedded UI generation system for generating UI display content associated with the fixed screen device. Other variations and combinations of developer defined instructions are contemplated with embodiments of the present invention.

The scene generation data may further include UI events, discussed in more detail below, that are processed. In particular, the scene generation data or the scene generation data having UI events are processed to generate scene configuration data 122. The scene configuration data 122 further identifies the plurality of scene processes and their hierarchical relationship and instructs on how (i.e., function) to supervise the scene processes for generating corresponding UI display content. For example, scene generation data that defines a hierarchy of different types of sensor data, and logic for processing the scene generation data, may be processed to generate scene configuration data 122 that is readable by the viewport engine to generate UI display content associated with scene configuration data 122. In another example, a UI event (e.g., an input via a touch screen) may be received and processed at the scene layer (e.g., scene engine 120) as scene generation data to generate scene configuration data 122. In this regard, scene generation data having the graph portion and the logic portion are processed in the scene layer to generate scene configuration data and the scene configuration data 122 is communicated to the viewport layer (e.g., viewport engine 130).

The viewport engine 130 is responsible for process the scene configuration data 122 and constructing scene management data structure 132. The viewport engine 130 can be implemented as a viewport layer. The viewport layer is a middle layer between the scene layer and the driver layer. In operation, the viewport layer receives communications (e.g., scene configuration data 122) from the scene layer, processes the communications based on the UI management and generation protocols (e.g., UI management and generation protocols 150), and then sends UI generation communications (e.g., scene rendering data 142) to the driver layer (i.e., driver engine 140). At a high level, the viewport layer processes, manages, and tracks scene processes using scene management data structures 132 (e.g., supervision tree, graphs and tables) for generating scene rendering data that is communicated to the driver layer.

The scene configuration data 122 is configured to identify which scene processes are to be initialized or de-initialized. The scene configuration data 122 also includes the relationship between the scene processes such that the scene management data structures are updated. For example, scene configuration data that is received from the scene layer may indicate a root scene process and its corresponding child scene processes. The scene processes in the scene generation data are initialized and a supervision tree, that supports scene process supervisions, and tables that support tracking graphs that are associated with the scene processes, are updated.

The scene configuration data 122 is used to construct the scene management data structure 132. The scene management data structure 132 may be the supervision tree as defined based on the UI language. For example, the scene management data structure 132 may be based on a model that includes scene processes, supervisors, and the supervision tree. Scene processes perform computations, supervisors are processes which monitor behaviors of the scene processes (e.g., a supervisor may start, stop, or restart a scene process). The supervision tree is a hierarchical arrangement of the user interface display content into scene processes and supervisors. The scene management data structure 132 may also include a table of different graphs defined the scene configuration data, that include references to different graphs in the hierarchical arrangement of supervised scene processes. Graphs reference scene processes that are running such that a viewport associated with the graph manages the corresponding scene processes. As discussed herein, the scene management data structure may generally refer to the supervision tree and/or the supervision tree and the corresponding tables that support tracking the different graphs associated with the supervision tree.

Several different UI management and generation protocols or rules (e.g., UI management and generation protocols 150) and UI fault recovery protocols or rules (e.g., UI fault recovery protocols 160) ("collectively protocols") may be defined for handling scene processes via the supervision tree. At a high level, the viewport engine 130 (e.g., viewport layer) is responsible for accessing the different protocols for constructing, including generating and updating, the scene management data structure 132 using scene configuration data 122. In particular, a viewport layer may support statically or dynamically managing scene processes. At a high level, dynamic scene processes may refer to scene processes that are initialized without user intervention, while static scene processes are initialized based on a user action trigger the initialization. As such, dynamic and static scene management can initialized be without and with human intervention correspondingly. Static scene processes may further be processes that are referenced and shared across multiple viewports, as discussed below.

The viewport layer supports having multiple active viewports. Multiple active viewports may be independently managed and used for generation of UI display content in association with the driver layer. For example, a first viewport may be generated with a set of child scene processes associated with the UI device, while a second viewport is generated with all of the plurality of scene processes associated with the UI device. Each viewport individually accesses corresponding graphs via the table tracking the graphs. The supervision tree manages the scene process that are referenced via the tables tracking the graphs.

The viewport layer also supports UI management protocols that set out specific rules for operations or action to be taken based on scene configuration data received. For example, UI management protocols may instruct on the hierarchical placement of different scene processes. In particular, identifying root scene processes and corresponding groups or sectors of scene processes for a particular graph. Root scene processes can specifically be configured to reference other graphs that are associated with the graph of the root scene. Root scene processes can also be merged as needed to generate the UI display content. The UI management protocols may instruct on boot order of scene processes associated with scene configuration data. In another example, the UI management protocols may also instruct on identifying statically and dynamically managed scene processes and their representation in the scene management data structure. Statically managed scene processes may be given a specific name as the statically managed scene processes are referenced by multiple viewports.

Moreover, the viewport layer also manages fault recovery operations based on the UI fault recovery protocols. The fault recovery protocols or fault recovery operations support the capacity of the user interface to recover from bugs and crashes. The fault recovery protocols or fault recovery operations are based rules on how to manage and update the scene management different situations. In particular, the hierarchical arrangement of scene processes may be impacted by a fault in a scene process and at least a portion of the remaining hierarchical arrangement may be maintained in a running state without having to reboot the application or device. The scene processes are independent and as such the impact of a fault in one scene process may be mitigated to avoid impacting the entire user interface or UI device. The UI fault recovery protocols and operations may indirectly indicate the extent of the impact a fault in a scene process because the protocols and fault recovery operations instruct on which scene processes may need to be restarted and re-initialized. For example, if a supervised scene process dies, then all supervised scene processes for the supervisor may be restarted according to a start specification. In addition, the impact of the fault in the scene process may result in a change in the hierarchical ordering of scene processes running for a particular interface. Other rules or protocols may define other types of dependencies and independencies between scene processes as needed to support causing display of UI display content, as previously discussed.

The viewport layer also supports matrix transformation operations for generating UI display content. The matrix transformation operations support flexibility on how to instruct the driver component to render the UI display content. For example, the viewport engine 130 may execute matrix transformation operations to change the position, rotation, and scale of object in the UI. Advantageously, the matrix transformation operations support efficient rendering operations via the driver component for video cards.

The viewport engine 130 further operates to generate scene rendering data 142 that is communicated to the driver engine 140 (e.g., driver layer). As discussed, the viewport layer performs processes on the scene generation data, constructs (i.e., generates or updates) a scene management data structure 132, for both UI generation operations and fault recovery operations. Upon constructing a scene management data structure 132 (e.g., the supervision tree, graphs, tables) the viewport layer may instruct the driver layer to retrieve scene rendering data. Scene rendering data 142, in an example embodiment, may refer to information identifying graphs of scene processes that are to be rendered. References to the graphs may be stored in tables that are tracking the graphs. In another example, embodiment, the scene rendering data 142 is communicated to the driver layer. Other variations of communicating with the driver layer scene rendering data 142 associated with UI display content are contemplated with embodiments described herein.

The driver engine 140 (e.g., driver layer) is responsible for rendering the UI display content based on the scene rendering data 142. The driver layer may be configured to retrieve the scene rendering data 142 from the viewport layer. By way of example, the scene rendering data 142 may be stored in a table in the viewport layer and upon receiving an indication from the viewport layer of updates to the scene management data structures 132 (i.e., the supervision tree and the tables) the driver layer may access a table that references a graph such that the driver layer accesses the latest version of the scene rendering data 142. In particular, the scene rendering data 142 includes the latest scene processes that have been updated and the scene rendering data 142 is used to generate UI display content associated with the scene processes.

The driver layer may specifically have different types of hardware drivers for different machines. The driver layer may also support different driver modes, including local mode, remote mode, and logging mode, each may be performed individually or concurrently. For example, a viewport layer may communicate scene rendering data and the scene rendering data is communicated to driver layer that renders the UI display content locally on the UI device, remote via a server on a UI viewing device, and alternatively in a log file. The driver layer may specifically have different drivers that each handle the scene rendering data 132 differently to achieve specific objectives. For example, a first application may operate with a first set of drivers to process the scene rendering data 132 to provide a first UI that is directly accessible from an IoT device, while a second application may operate with a second set of drivers to process the scene rendering data to provide a second UI that is remotely accessed (i.e., not accessed directly) via the IoT device, as discussed below in more detail.

The UI generation system 100 also supports an architecture-independent system for remote graphical user interfaces and input device capabilities. In particular, the driver layer operates with the distributed components, such as, UI server client 170 and the UI viewing device client 180 to provide distributed user interface generations. For example, a UI viewing device (e.g., UI viewing device 180A) is capable of interacting with the UI display content on the UI device 110A with any type of user input device. UI generation operations are processed and executed on the UI device 110A and communicated as scene rendering data 142 to the UI viewing device 180A. The UI viewing device 180A may operate with a server (e.g., UI server 170A), such that the UI viewing device 180A both requests scene rendering data 142 and also receive events from as input (e.g., via a keyboard, mouse, or touchscreen). The server receives user events from the UI viewing device 180A and communicates them to the UI device 110A for additional processing using the UI generation system on the UI device 110A. It is contemplated that the server can operate as a reflector that communicates scene rendering data and events between the UI device and the UI viewing device. In embodiments, the scene rendering data 142 may be encrypted prior to communicating the scene rendering data.

It is further contemplated that when input is received directly or remotely, in response to a generated user interface, the different layers process the input events in reverse order as described herein. For example, the touch screen input may be captured as screen coordinates that communicated to the driver layer, then the viewport layer, and the scene layer to determine the impact of the input event. The driver layer may understand the hardware interface such that the driver layer may receive the inputs event and operate with the viewport and the scene layer to process events and update scene management data structure and render scene rendering data to update the UI display content. For example, the viewport layer and scene layer may execute operations discussed herein upon receiving UI events to be processed for updating UI display content.

Figure 2:
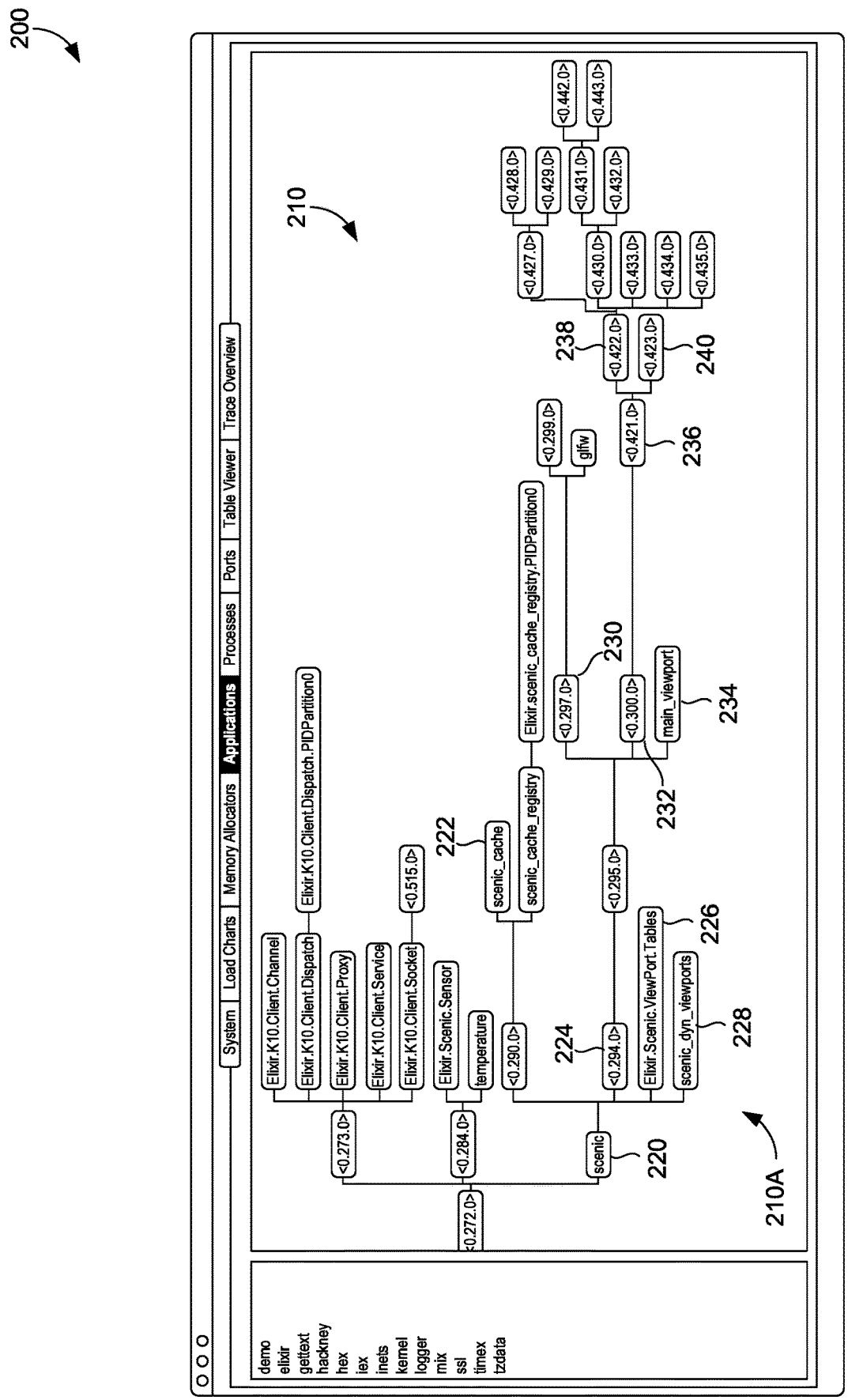
FIG. 2 is a schematic of an example supervision tree for a user interface generation system, in accordance with embodiments described herein.
Figure 3:
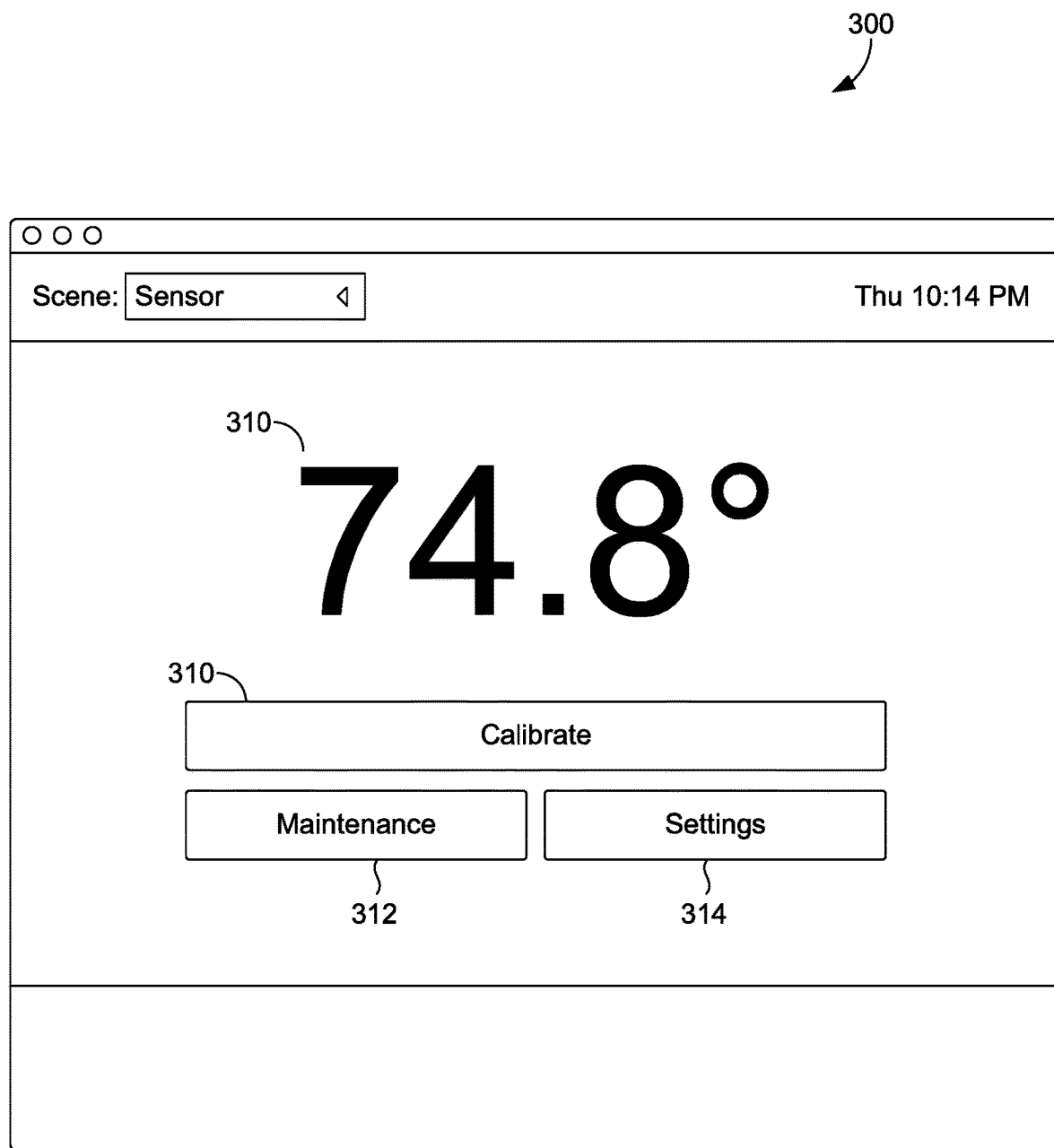
FIG. 3 is a schematic of an example UI with UI display content generated using the user interface generation system, in accordance with embodiments described herein.

Turning to FIG. 2 and FIG. 3, an example UI supervision tree and a UI interface that is running, respectively, are illustrated. The UI language provides the underlying supervision framework, how the supervision tree is generated based on instructions defined in the multi-layer UI engine which performs operations for generating and managing the scene management data structures, and further for generating the UI interface having UI display content. FIG. 2, FIG. 2 illustrates a UI scene management data structure environment 200. The UI scene management data structure environment 200 includes an Applications interface 210 that illustrates information relevant to the UI scene management data structure supervision operations. In particular, the Applications interface 210 includes a lower section (i.e., lower section 210A) with specific lower section 210 A features (e.g., processes) that are associated with the viewport layer, the scene layer, and the driver layer. By way of the example, a primary supervisor "scenic" (i.e., scenic 220) may be established as illustrated in the lower section 210A. Scenic supervises several primary branches of the supervision tree. The "scenic_cache" 222 branch represents an in-memory static file cache. The second branch starts with the anonymous <0.294> branch. <0.294.0>224 can be associated with the viewport layer and scene layer. The "Elixir.Scenic.ViewPort.Tables" 226 represents a core process that handles the tables that pass graphs from the scenes to the driver layer. The "scenic_dyn_viewports" 228 represents a (e.g., empty) dynamic supervisor that would be used to open and close dynamic viewports if there were any. Dynamic viewports are associated with opening and closing new windows. The "Elixir.Scenic.ViewPort.Tables" 226 process can be further configured, to support fault recovery operations. For example, "Elixir.Scenic.ViewPort.Tables" 226 process, upon a crash, may restart child scene processes.

Further in the lower section 210A, additional processes may define a branch associated with the viewport layer (e.g., a (viewport branch). The viewport branch can specifically be a split representation with the nodes <0.297.0>230, <0.300.0>232, and "main_viewport" 234 are represented. The <0.297.0>230 branch can be a dynamic supervisor that owns the drivers. The <0.300.0>232 process can be a supervisor that manages the root of the primary scene itself. The "main_viewport" 234 can be configured as the ViewPort itself. Processes can be crash interrelated in that if any process interrelated with another process crashes, the interrelated processes are rebooted.

With continued reference to the lower section 210, processes can be configured to supervise scene processes and sub-scene processes that support causing display of UI display content. For example, <0.421.0>236 starts a supervision that repeats iteratively for each scene process and sub-scene process. Its upper child <0.422.0>238 is a dynamic supervisor that manages th3 scene's children. <0.423.0>240 can be the scene itself. In particular, for the child scene process, the same pattern repeats. (e.g., <0.430.0> is a supervisor. <0.432.0> is a scene process. <0.432.0> is that scene process' dynamic supervisor). Scene processes that are specifically marked as no children are leaf nodes and are not paired with a DynamicSupervisor for its child scene process.

Scene processes can be configured to build graphs that cause display of UI display content features (e.g., button elements) and operate with function calls to support the functionality described herein. In particular, when scene process <0.423.0>240 builds its graph, as shown in the code below, it adds three button elements, Nav.add_to_graph, and Notes.add_to_graph. Each of the button element can be configured to insert an object (e.g., SceneRef object) with data pointing to a module and initial startup data. Additionally, a function calls (e.g., push_graph call) support other aspects of UI management. For example, when push_graph is called, there are no child scene processes yet; however the push_graph function can access objects of process to support UI management. The push_graph function may scan an incoming graph, and then identify any SceneRefs that are not already running, and starts those scene processes under a DynamicSupervisor attached to that scene. Table 1 below includes code associated with building graphs that cause display of UI display content features (e.g., button elements) and operate with function calls.

TABLE 1

```
graph = Graph.build( font: :roboto, font_size: 16, theme: :dark )
  # text input
  |> group(fn(graph) ->
    graph
    |> text(
      "", id: :temperature, text_align: :center,
      font_size: @font_size, translate: {vp_width / 2, @font_size}
    )
    |> group( fn(g) ->
      g
      |> button( "Calibrate", width: col * 4, height: 46, theme: :primary )
      |> button(
        "Maintenance", width: col * 2 - 6, height: 46,
        theme: :secondary, translate: {0, 60}
      )
      |> button(
        "Settings", width: col * 2 - 6, height: 46,
        theme: :secondary, translate: {col * 2 + 6, 60}
      )
    end, translate: {col, @font_size + 60}, button_font_size: 24)
  end, translate: {0, @body_offset} )
  # NavDrop and Notes are added last so that they draw on top
  |> Nav.add_to_graph( __MODULE__ )
  |> Notes.add_to_graph( @notes )
  |> push_graph( )
```

Additionally, when child scenes push their graphs, the child graphs are in turn evaluated by the push_graph function and any child scenes that are requested get started. As such, a supervision tree with embodiments discussed herein can be dynamically generated from static graph data provided a scene. A push_graph can keep state about what children have been started and what nodes in the graph they are mapped to, such that if the scene were to delete one of the buttons from the graph the push_graph would update the data because of the supervision or control relationship with the push_graph. Once the supervision tree has been built by the push_graph function, then can the UI language execute operations to restart scene processes that crashed.

Table 2 below includes an example algorithm for a push_graph function in accordance with embodiments described herein. The algorithm may be implemented every time push_graph is called. The push_graph algorithm is configured to build the supervision tree such that the UI language can run a relatively simple restart heuristics on.

TABLE 2

1) Scans the graph, finding all the SceneRefs.
2) Determines which Scene Refs are new (compared to the a previous state stored about the running scenes)
3) Starts the identified new scene supervisors, which may start a scene (if it has no children) or start a scene/DyanmicSupervisor pair if it does.
4) Record a mapping of new scene/supervisors to the graph elements that created them for subsequent identification of scene/supervisor relationship to graph eleemnts.
5) Determines which old scenes are no longer in the graph
6) Stop old scenes.
7) Replaces the SceneRef elements in the graph with versions that point to the actual scenes. (e.g., incoming data is module/data pairs control starting a scene (e.g., instructions on how to start a scene). Once the scene is running the scene can be configured with a pointer to the actual scene process)
8) Insert a resulting graph into a table so that the resulting graph can be quickly traversed by the drivers and input system
9) Clean up and save the updated state.

In addition, a "restart specification" can be configured as a supervision tree itself. The UI language does the restarting according to the rules laid out in the supervision tree. Push_graph function, which is part of the scene or view-graph machinery "programs" of the supervision tree so that UI language such that the supervision tree can do the relatively simple job of restarting processes when the process crash. While algorithmically creating the supervision tree, as discussed, can be challenging, the intelligence built into the supervision tree simplifies restarting process.

With continued reference to Applications interface 210, the supervision tree structure is a set of instructions that is processed based on the UI language providing instructions to restart processes when a crash occurs. Generally, if a first node on the left (i.e., relative to another node on the right of the supervision tree) crashes, nodes to the right of the first node are restarted. It is contemplated that specific instructions on how to build a supervision can be performed by an application layer of an application. For example, is how the application "programs" the UI language restart scene processes, can be configured for the corresponding application.

Table 3 below illustrates an example algorithm for push_graph functionality discussed above. For example, a push_graph, interprets the incoming graph and uses it to build the supervision tree, thus building a hierarchical process relationship that the UI language uses during its error handling.

TABLE 3

```
#--------------------------------------------------------
# push a graph to the "ets" table and manage embedded dynamic child scenes
def handle_cast({:push_graph, graph, sub_id, true}, %{
    scene_ref: scene_ref,
    raw_scene_refs: raw_scene_refs,
    dyn_scene_pids: dyn_scene_pids,
    dyn_scene_keys: dyn_scene_keys,
    dynamic_children_pid: dyn_sup,
    viewport: viewport
  } = state ) do
    # reduce the incoming graph to it's minimal form
    # while simultaneously extracting the SceneRefs
    # perform full scan when pushing a graph
    {graph, all_keys, new_raw_refs} = Enum.reduce( graph.primitive_map, {%{ }, %{ }, %{ }},
fn
    # named reference
    ({uid, %{module: Primitive.SceneRef, data: name} = p},
    {g, all_refs, dyn_refs}) when is_atom(name) ->
        g = Map.put( g, uid, Primitive.minimal(p) )
        all_refs = Map.put( all_refs, uid, {:graph, name, nil} )
        {g, all_refs, dyn_refs}
    # explicit reference
    ({uid, %{module: Primitive.SceneRef, data: {:graph,_,_} = ref} = p},
    {g, all_refs, dyn_refs}) ->
        g = Map.put( g, uid, Primitive.minimal(p) )
        all_refs = Map.put( all_refs, uid, ref )
        {g, all_refs, dyn_refs}
    # dynamic reference
    # don't add to all_refs yet. Will add after it is started (or not)
    ({uid, %{module: Primitive.SceneRef, data: {_,_} = ref} = p},
    {g, all_refs, dyn_refs}) ->
        g = Map.put( g, uid, Primitive.minimal(p) )
        dyn_refs = Map.put( dyn_refs, uid, ref )
        {g, all_refs, dyn_refs}
```

TABLE 3-continued

```
    # all non-SceneRef primitives
    ({uid, p}, {g, all_refs, dyn_refs}) ->
        {Map.put( g, uid, Primitive.minimal(p) ), all_refs, dyn_refs}
    end)
    # get the old refs
    old_raw_refs = Map.get( raw_scene_refs, sub_id, %{ } )
    old_dyn_pids = Map.get( dyn_scene_pids, sub_id, %{ } )
    old_dyn_keys = Map.get( dyn_scene_keys, sub_id, %{ } )
    # get the difference script between the raw and new dynamic refs
    raw_diff = Utilities.Map.difference( old_raw_refs, new_raw_refs )
    # Use the difference script to determine what to start or stop.
    {new_dyn_pids, new_dyn_keys} = Enum.reduce(raw_diff, {old_dyn_pids, old_dyn_keys},
fn
    {:put, uid, {mod, init_data}}, {old_pids, old_keys} -> # start this dynamic scene
        unless dyn_sup do
            raise "You have set a dynamic SceneRef on a graph in a scene where has_children is false"
        end
        styles = Map.get(graph[uid], :styles, %{ })
        init_opts = case viewport do
            nil -> [styles: styles]
            vp -> [viewport: vp, styles: styles]
        end
        # start the dynamic scene
        {:ok, pid, ref] = mod.start_dynamic_scene( dyn_sup, self( ), init_data, init_opts )
        # add the this dynamic child scene to tracking
        {
            Map.put(old_pids, uid, pid),
            Map.put(old_keys, uid, {:graph, ref, nil})
        }
    {:del, uid}, {old_pids, old_keys} -> # stop this dynaic scene
        # get the old dynamic graph reference
        pid = old_pids[uid]
        # send the optional deactivate message and terminate. ok to be async
        Task.start fn ->
            GenServer.call(pid, :deactivate)
            GenServer.cast(pid, {:stop, dyn_sup})
        end
        # remove old pid and key
        {Map.delete(old_pids, uid), Map.delete(old_keys, uid)}
    end)
    # merge all_refs with the managed dyanmic keys
    all_keys = Map.merge( all_keys, new_dyn_keys )
    graph_key = {:graph, scene_ref, sub_id}
    # insert the proper graph keys back into the graph to finish normalizing
    # it for the drivers. Driver may perform operation from the all_keys term
    # that is also being written into the ets table, but it gets done all the
    # time for each reader function and when consuming input at the defined time Note that the
all_keys term is still being written becuase
    # otherwise the drivers would need to do a full graph scan in order to prep whatever translators
they need.
# The info has already been calculated at the defined time, so info is passed along
    graph = Enum.reduce(all_keys, graph, fn({uid, key}, g)->
        put_in(g, [uid, :data], {Scenic.Primitive.SceneRef, key})
    end)
    # write the graph into the ets table
    ViewPort.Tables.insert_graph( graph_key, self( ), graph, all_keys)
    # store the refs for next time
    state = state
    |> put_in( [:raw_scene_refs, sub_id], new_raw_refs )
    |> put_in( [:dyn_scene_pids, sub_id], new_dyn_pids )
    |> put_in( [:dyn_scene_keys, sub_id], new_dyn_keys )
    { :noreply, state }
end
```

With reference to FIG. 3, FIG. 3 illustrates example UI display content 300 based on functionality described. In particular, the UI display content ("sensor") illustrates a scene that displays data from a simulated sensor. The sensor is defined in a library (e.g., /lib/sensors/temperature) and operates based on a scenic processed (e.g., scenic Sensor). As described herein, the UI display content can be caused to be displayed based on: scene generation data, scene management data structure based on the scene configuration data, a scene rendering data table. Other variations and combinations of graphical interface components and features are contemplated with embodiments of the present invention.

With reference to graphical components displayed in FIG. 3, the buttons (i.e., calibrate 310, maintenance 312, and settings 314) are shown and aligned to the multi-layer UI engine, where the multi-layer UI engine includes a scene layer, viewport layer, and driver layer (e.g., scene engine, viewport engine, and driver engine). The multi-layer UI engine provides operations based on hierarchy-based elements and supervision, corresponding to the UI language, scene protocols and rules, and scene data structures. As discussed below in more detail, the scene layer, viewport layer, and driver layer may be configured to interoperate based on UI management and generation protocols, such that scene UI operations are executed and UI generation data are communicated between layers for generating user interfaces.

Embodiments of the present invention have been described with reference to several inventive features associated with a user interface generation system. Inventive features described include processing of user interface (UI) generation data or instructions based on a multi-layer architecture that processes and manages hierarchically interrelated and supervised scene processes. In particular, the UI generation system provides for generating UIs based on a scene layer, a viewport layer, and a driver layer that each support processing and managing hierarchical interrelated and supervised scene processes, using rules or protocols and data structures to support UI generation, UI fault recovery operations, and distributed UI generation for remote viewing devices. Functionality of the embodiments of the present invention have further been described, by way of an implementation and anecdotal examples, to demonstrate that the operations for processing user interface generation based on unconventional ordered combination of operations in the multi-layer UI engine, UI sever client, the UI viewing device client, as a solution to a specific problem in search technology environment to improve computing operations in user interface generation systems. Overall, these improvements result in less CPU computation, smaller memory requirements, and increased robustness, security, and accessibility in user interface generation technology. Advantageously, the operations, data structures, and the ordered combination of steps improve UI functionality for the generation UIs by providing more efficient processing, storage, retrieval, and management of UI generation data and improved computing functionality for user navigation of user interfaces.

Example Methods for Providing a User Interface Generation System

Figure 4:
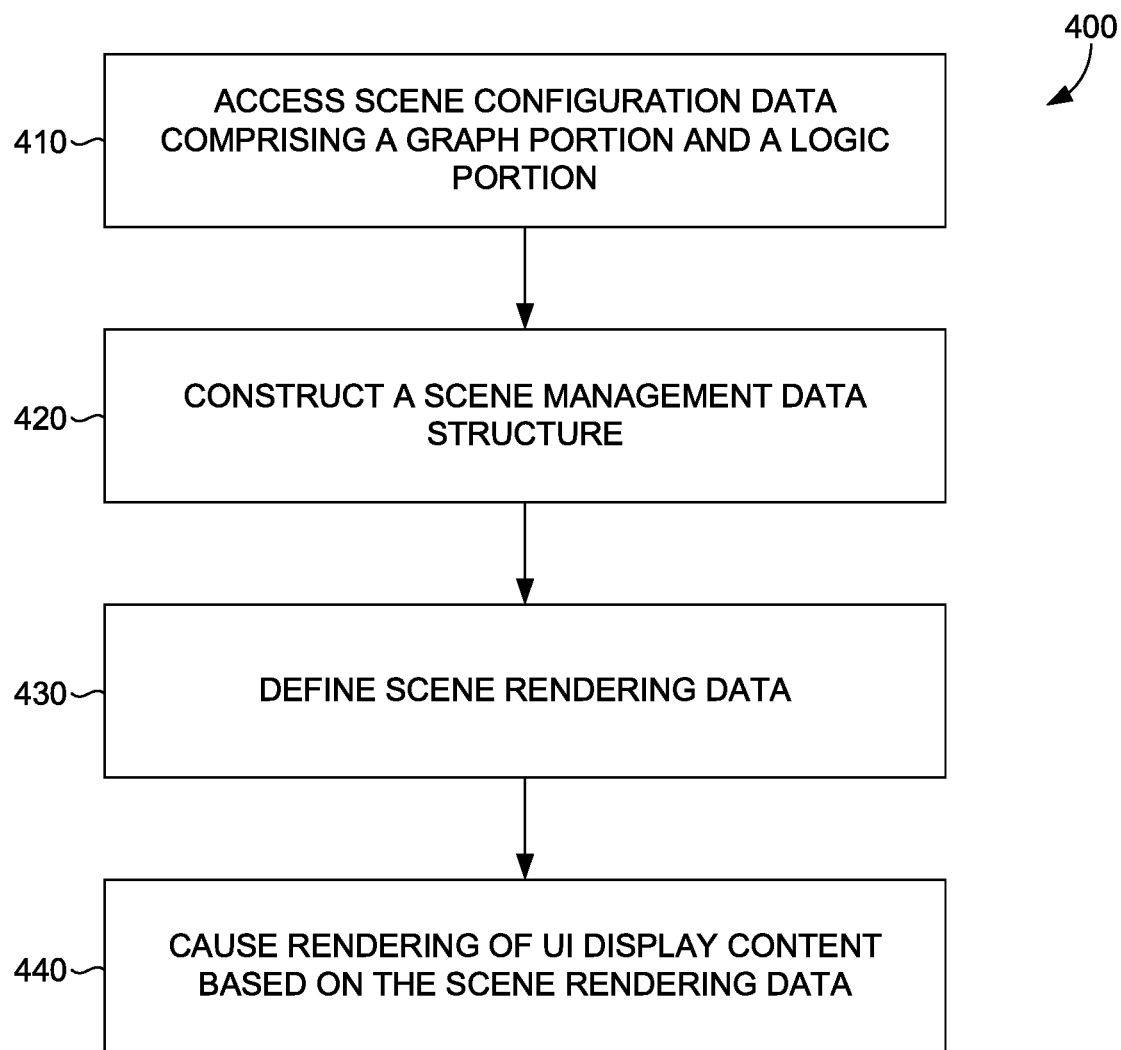
FIG. 4 is a flow diagram showing an exemplary method for implementing a user interface generation system, in accordance with embodiments described herein.
Figure 5:
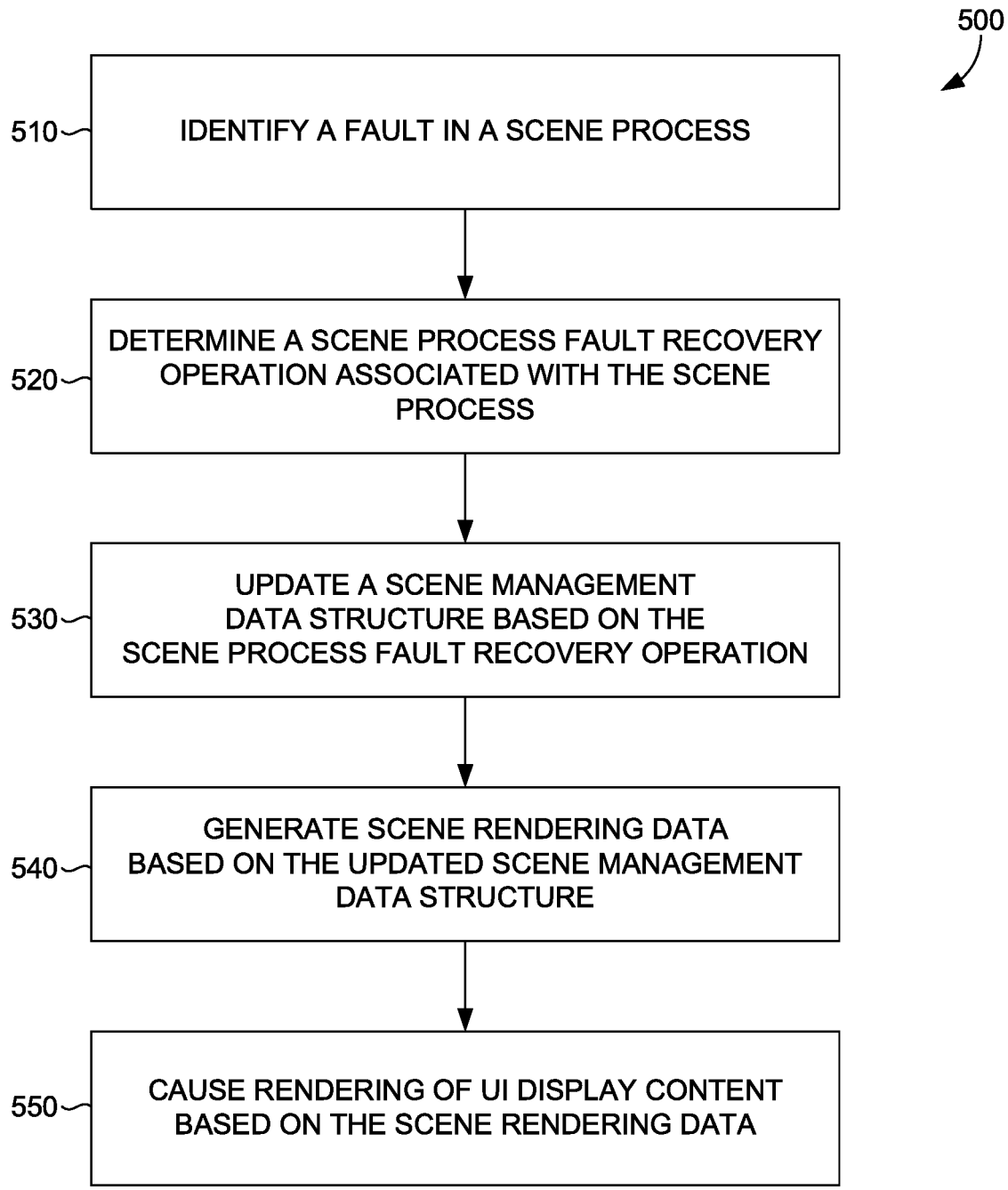
FIG. 5 is a flow diagram showing an exemplary method for implementing a user interface generation system, in accordance with embodiments described herein.
Figure 6:
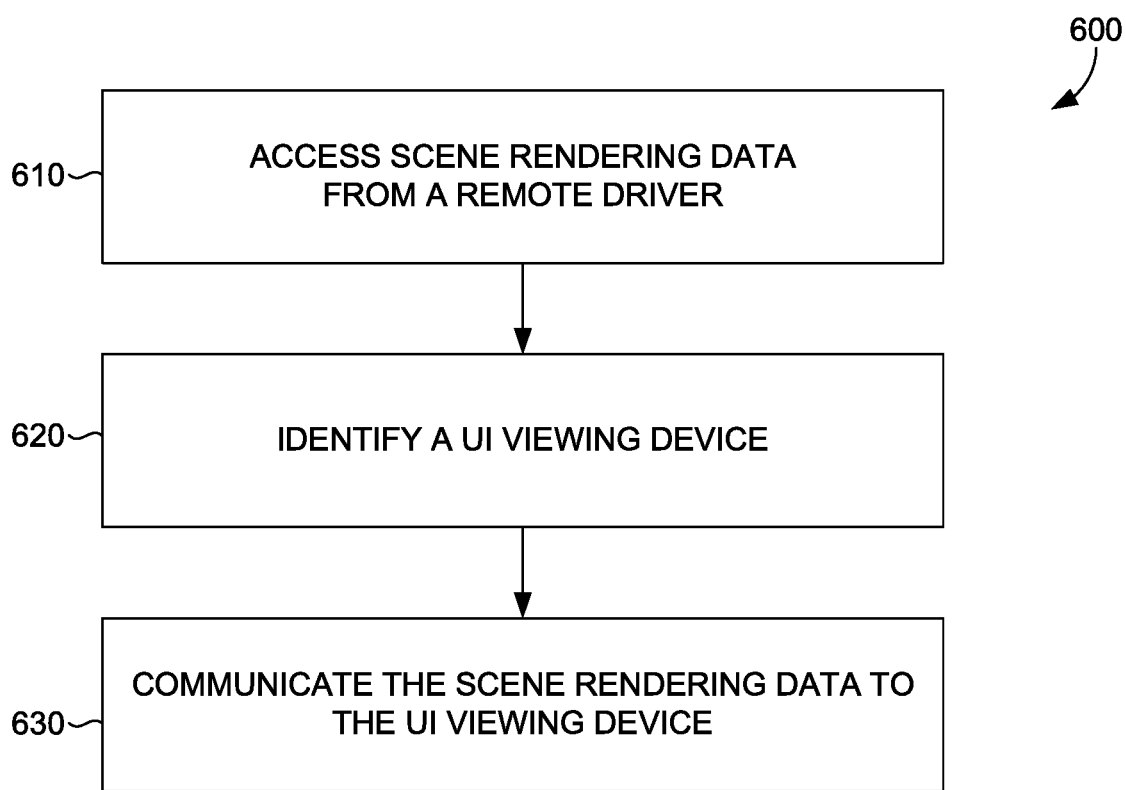
FIG. 6 is a flow diagram showing an exemplary method for implementing a user interface generation system, in accordance with embodiments described herein.

With reference to FIGS. 4, 5, and 6, flow diagrams are provided illustrating methods for implementing a user interface generation system. The methods may be performed using the user interface generation system described herein. In embodiments, one or more computer storage media having computer-executable instructions embodied thereon that, when executed, by one or more processors, can cause the one or more processors to perform the methods in the user interface generation system.

Turning to FIG. 4, a flow diagram is provided that illustrates a method 400 for implementing a user interface generation system. Initially at block 410, scene generation data is accessed at a scene engine. The scene generation data comprises a graph portion and a logic portion comprising instructions for generating UI display content. Based on the scene generation data, a scene configuration data is generated. The scene configuration data comprises a plurality of scene processes that are hierarchically interrelated and supervised, the plurality of scene processes corresponding to UI display content. The scene configuration data is communicated to a viewport engine. At block 420, a scene management data structure is constructed based on the scene configuration data. Constructing the scene management data structure comprises defining a hierarchical arrangement of the plurality of scene processes that are supervised. At block 430, based on constructing the scene management data structure, scene rendering data is defined in a scene rendering data table and communicated to a driver engine configured. At block 440, rendering of UI display content is cased based on scene rendering data in the scene rendering data table, accessed by the driver engine.

Turning to FIG. 5, a flow diagram is provided that illustrates a method 500 for implementing a user interface generation system. Initially at block 510, a fault in a scene process is identified for a UI scene comprising the UI scene process and the plurality of scene processes. At block 520, a scene process fault recovery operation associated with the scene process is determined for the UI scene process associated with the scene process and the plurality of scene processes. At block 530, a scene management data structure based on the scene process fault recovery operation is updated. The scene management data structure comprises a hierarchical arrangement of the scene process and the plurality of scene processes that are supervised. At block 540, scene rendering data is generated based on the updated scene management data structure. At block 550, UI display content is caused to be rendered based on the scene rendering data.

Turning to FIG. 6, a flow diagram is provided that illustrates a method 600 for implementing a user interface generation system. Initially at block 610, scene rendering data is accessed from a remote driver. At block 620, a UI viewing device is identified for the scene rendering data. At block 630, the scene rendering data is communicated to the UI viewing device, such that, based on the scene rendering data, UI viewing device client accessed the scene rendering data to cause rendering of UI display content.

Example User Interface Generation System

With reference to the user interface generation system 100, embodiments described herein support providing the user interface generation system for processing UI generation data or instructions based on a multi-layer architecture that processes and manages hierarchically interrelated and supervised scene processes. The user interface generation system components refer to integrated components that implement the user interface generation system. The integrated components refer to the hardware architecture and software framework that support functionality using the user interface generation system components. The hardware architecture refers to physical components and interrelationships thereof and the software framework refers to software providing functionality that may be implemented with hardware operated on a device. The end-to-end software-based user interface generation system may operate within the other components to operate computer hardware to provide user interface generation system functionality. As such, the user interface generation system components may manage resources and provide services for the user interface generation system functionality. Any other variations and combinations thereof are contemplated with embodiments of the present invention.

By way of example, the user interface generation system may include an API library that includes specifications for routines, data structures, object classes, and variables may support the interaction the hardware architecture of the device and the software framework of the user interface generation system. These APIs include configuration specifications for the user interface generation system such that the components therein may communicate with each other for the novel functionality described herein.

With reference to FIG. 1, FIG. 1 illustrates an exemplary user interface generation system 100 in which implementations of the present disclosure may be employed. In particular, FIG. 1 shows a high level architecture of user interface generation system 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components, managers, engines, or generators as hardware, software, firmware, a special-purpose device, or any combination thereof. A system may be integrated into a single device or it may be distributed over multiple devices. The various components, managers, engines, or generators of a system may be co-located or distributed. For example, although discussed for clarity as a singular component, operations discussed may be performed in a distributed manner. The system may be formed from other systems and components thereof. It should be understood that this and other arrangements described herein are set forth only as examples.

Each of the identified components in FIG. 1 may represent a plurality of different instances of the component. The components of the user interface generation system 100 may communicate with each other over one or more networks (e.g., public network or virtual private network "VPN") as shown with network 190. The network 170 may include, without limitation, one or more local area networks (LANs) and/or wide area networks (WANs). The computing devices (e.g., UI device 110A, UI server 170A, and UI view device 180A) may be computing devices that correspond to the computing device described herein with reference to FIG. 7. The components of the user interface generation system 100 may operate together to provide functionality for processing and managing UI data for presenting UI display content based on corresponding hierarchically related and supervised scene processes.

Example Operating Environment

Having identified various component of the user interface generation system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The user interface generation system 100 functionality may be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Having described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
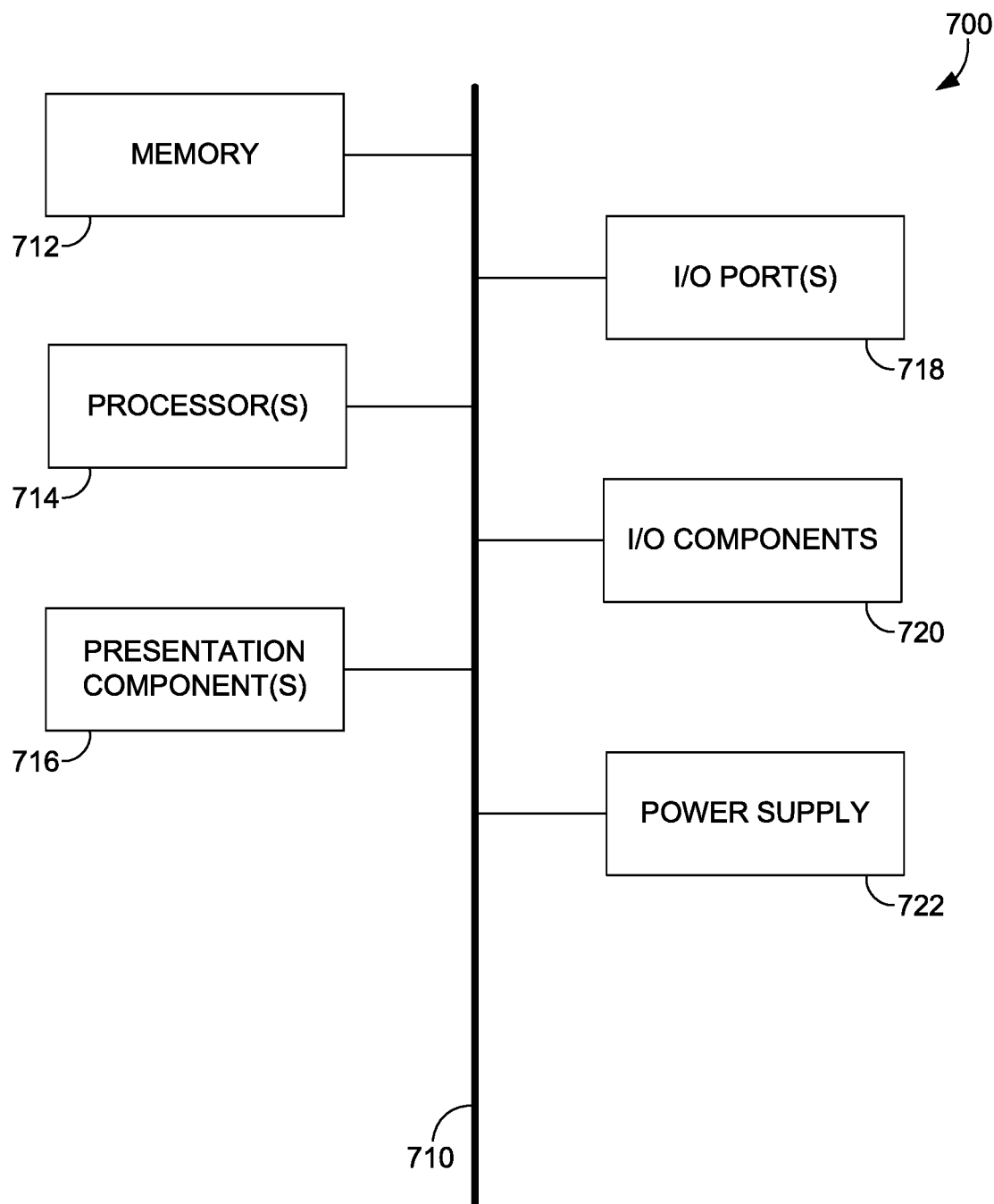
FIG. 7 is a block diagram of an exemplary computing environment suitable for use in implementing embodiments described herein.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing" or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the user interface generation system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for providing user interface (UI) generation, the system comprising:
   one or more computer processors; and
   computer memory storing computer-useable instructions that, when used by the one or more computer processors, cause the one or more computer processors to perform operations comprising:
   a multi-layer user interface (UI) engine configured to:
   identify a fault in a scene process for a UI scene comprising a UI scene process and a plurality of scene processes;
   determine a scene process fault recovery operation for the UI scene process associated with the scene process and the plurality of scene processes;
   based on the scene process fault recovery operation, update a scene management data structure;
   generate scene rendering data based on the updated scene management data structure,
   wherein the scene rendering data is associated with a scene rendering data table, the scene rendering table tracks graphs referencing one or more scene processes in supervision trees of scene supervisors,
   wherein the scene rendering data is defined based on scene management data associated with a hierarchical arrangement of a plurality of scene processes,
   wherein the graphs are associated with UI management and generation protocols that support a scene management data structure, the scene management data structure comprising supervision trees, graphs, and tables, and
   wherein the plurality of scene processes are supervised by the scene supervisors, the scene supervisors control the one or more scene processes of the graphs referencing the one or more scene processes; and
   cause rendering of UI display content based on the second scene rendering data.

2. The system of claim 1, wherein the multi-layer UI engine provides fault recovery protocols associated with fault recovery operations, wherein the fault recovery protocols support maintaining a portion of the hierarchical arrangement of a plurality of scene processes in a running state without rebooting while managing the fault in the scene process.

3. The system of claim 1, wherein a UI language defines the UI management and the generation protocols for UI generation, wherein the UI language is used to process UI generation data based on a multi-layered architecture that processes and manages the plurality of scenes, wherein the UI management and generation protocols support communicating between the scene engine, the viewport engine, and the driver engine, the UI management and the generation protocols are based on the same UI language.

4. The system of claim 1, wherein the scene management data structure comprises a table of graphs defined based on the scene configuration data.

5. The system of claim 1, wherein a graph references actively running scene processes that are statically or dynamically managed using a plurality of active viewport layers associated with the viewport engine.

6. The system of claim 1, further comprising:
a UI server client configured to:
access the scene rendering data;
identify a viewing device for the scene rendering data; and
communicate scene rendering data to a UI generation viewing device.

7. The system of claim 1, further comprising:
a UI viewing device client configured to:
access the scene rendering data; and
based on the scene rendering data, cause rendering of UI display content.

8. One or more computer storage media having computer-executable instructions embodied thereon that, when executed, by one or more processors, cause the one or more processors to perform a method for providing user interface (UI) generation, the method comprising:
identifying a fault in a scene process for a UI scene comprising a UI scene process and a plurality of scene processes;
determining a scene process fault recovery operation for the UI scene process associated with the scene process and the plurality of scene processes;
based on the scene process fault recovery operation, updating a scene management data structure;
generating scene rendering data based on the updated scene management data structure,
wherein the scene rendering data is associated with a scene rendering data table, the scene rendering table tracks graphs referencing one or more scene processes in supervision trees of scene supervisors,
wherein the scene rendering data is defined based on scene management data associated with a hierarchical arrangement of a plurality of scene processes,
wherein the graphs are associated with UI management and generation protocols that support a scene management data structure, the scene management data structure comprising supervision trees, graphs, and tables, and
wherein the plurality of scene processes are supervised by the scene supervisors, the scene supervisors control the one or more scene processes of the graphs referencing the one or more scene processes; and
causing rendering of UI display content based on the second scene rendering data.

9. The media of claim 8, wherein the multi-layer UI engine provides fault recovery protocols associated with fault recovery operations, wherein the fault recovery protocols support maintaining a portion of the hierarchical arrangement of a plurality of scene processes in a running state without rebooting while managing the fault in the scene process.

10. The media of claim 8, wherein a UI language defines the UI management and the generation protocols for UI generation, wherein the UI language is used to process UI generation data based on a multi-layered architecture that processes and manages the plurality of scenes, wherein the UI management and generation protocols support communicating between a scene layer, a viewport layer, and the driver layer, the UI management and the generation protocols are based on the same UI language.

11. The media of claim 8, wherein the scene management data structure comprises a table of graphs defined based on the scene configuration data.

12. The media of claim 8, wherein a graph references actively running scene processes that are statically or dynamically managed using a plurality of active viewport layers associated with the viewport engine.

13. The media of claim 8, wherein the scene rendering data comprises information identifying graphs of scene processes, wherein graphs are stored in tracked tables.

14. The media of claim 8, the method further comprising communicating the scene rendering data to a remote UI generation device to cause a UI viewing device client to cause rendering of UI display content based on the scene rendering data.

15. A method for providing user interface (UI) generation, the method comprising:
identifying a fault in a scene process for a UI scene comprising a UI scene process and a plurality of scene processes;
determining a scene process fault recovery operation for the UI scene process associated with the scene process and the plurality of scene processes;
based on the scene process fault recovery operation, updating a scene management data structure;
generating scene rendering data based on the updated scene management data structure,
wherein the scene rendering data is associated with a scene rendering data table, the scene rendering table tracks graphs referencing one or more scene processes in supervision trees of scene supervisors,
wherein the scene rendering data is defined based on scene management data associated with a hierarchical arrangement of a plurality of scene processes,
wherein the graphs are associated with UI management and generation protocols that support a scene management data structure, the scene management data structure comprising supervision trees, graphs, and tables, and
wherein the plurality of scene processes are supervised by the scene supervisors, the scene supervisors control the one or more scene processes of the graphs referencing the one or more scene processes; and
causing rendering of UI display content based on the second scene rendering data.

16. The method of claim 15, wherein the multi-layer UI engine provides fault recovery protocols associated with fault recovery operations, wherein the fault recovery protocols support maintaining a portion of the hierarchical arrangement of a plurality of scene processes in a running state without rebooting while managing the fault in the scene process.

17. The method of claim 15, wherein a UI language defines the UI management and the generation protocols for UI generation, wherein the UI language is used to process UI generation data based on a multi-layered architecture that processes and manages the plurality of scenes, wherein the UI management and generation protocols support communicating between the scene engine, the viewport engine, and the driver engine, the UI management and the generation protocols are based on the same UI language.

18. The method of claim 15, wherein the scene management data structure comprises a table of graphs defined based on the scene configuration data.

19. The method of claim 15, wherein the scene management data structure comprises a table of graphs defined based on the scene configuration data, wherein a graph references actively running scene processes that are statically or dynamically managed using a plurality of active viewport layers associated with a viewport layer.

20. The method of claim 15, the method further comprising communicating the scene rendering data to a remote UI generation device to cause a UI viewing device client to cause rendering of UI display content based on the scene rendering data, wherein the scene rendering data comprises information identifying graphs of scene processes, wherein graphs are stored in tracked tables.

* * * * *